United States Patent
Brooks et al.

(10) Patent No.: US 10,348,840 B2
(45) Date of Patent: Jul. 9, 2019

(54) DYNAMIC WORKFLOW CONTROL BETWEEN NETWORK ENTITIES

(71) Applicant: INTERNATIONAL BUSINESS MACHINES CORPORATION, Armonk, NY (US)

(72) Inventors: Michael D. Brooks, Hursley (GB); Alan Hollingshead, Hursley (GB); Julian C. Horn, Hursley (GB); Philip I. Wakelin, Hursley (GB); Russell I. Wilson, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 161 days.

(21) Appl. No.: 15/406,903

(22) Filed: Jan. 16, 2017

(65) Prior Publication Data
US 2018/0205799 A1    Jul. 19, 2018

(51) Int. Cl.
*G06F 15/173* (2006.01)
*H04L 29/08* (2006.01)
*H04L 29/06* (2006.01)

(52) U.S. Cl.
CPC .............. *H04L 67/16* (2013.01); *H04L 67/10* (2013.01); *H04L 67/42* (2013.01)

(58) Field of Classification Search
CPC ......... H04L 67/16; H04L 67/10; H04L 67/42; H04L 29/08
See application file for complete search history.

(56) References Cited

U.S. PATENT DOCUMENTS

| 7,752,629 | B2 | 7/2010 | Revanuru et al. |
| 8,069,209 | B1 * | 11/2011 | Levesque ............... G06F 9/485 709/206 |
| 8,856,222 | B2 | 10/2014 | McCanne et al. |
| 9,246,819 | B1 | 1/2016 | Thirasuttakorn |
| 9,253,025 | B1 | 2/2016 | Vinapamula Venkata |

(Continued)

OTHER PUBLICATIONS

"Best Practices for Developing with Microsoft Dynamics CRM"; www.microsoft.com/en-us/library, Sep. 13, 2016 (11 pages).

*Primary Examiner* — Cheikh T Ndiaye
(74) *Attorney, Agent, or Firm* — William Kinnaman, Esq.; Kevin P Radigan, Esq.; Heslin Rothenberg Farley & Mesiti P.C.

(57) ABSTRACT

In a network capable of handling a number of concurrent network connections between network nodes, referred to as client and server, the client and server connection managers are customized by adding respective status handler components which add server status information requests, from client to server, and responsive status information, from server to client into message headers of messages being sent between the server and client. The supported server status information types for any given connection are defined when a connection is established through dialogue between the client and server, and then persist for the lifetime of the connection. The customizations of the server and client connection managers are modest and the increase in network traffic over the connection is proportionally very small. Moreover, status information requests can be processed and responded to quickly by attaching to messages that are being sent between the nodes.

20 Claims, 3 Drawing Sheets

(56) References Cited

U.S. PATENT DOCUMENTS

| | | | | |
|---|---|---|---|---|
| 2001/0042122 A1* | 11/2001 | Pierre Cote | ......... | G06F 11/3495 709/224 |
| 2003/0217130 A1* | 11/2003 | Tang | ....................... | H04L 29/06 709/223 |
| 2004/0103342 A1* | 5/2004 | Moser | ................. | G06F 11/2038 714/4.4 |
| 2009/0282287 A1* | 11/2009 | Oe | ...................... | G06F 11/3419 714/37 |
| 2010/0274922 A1 | 10/2010 | Reavely | | |
| 2011/0282930 A1* | 11/2011 | Bocirnea | .................. | H04Q 9/00 709/203 |
| 2013/0205017 A1* | 8/2013 | Hirose | ................ | H04L 43/0817 709/224 |
| 2016/0087933 A1 | 3/2016 | Johnson et al. | | |

* cited by examiner

DYNAMIC WORKFLOW CONTROL BETWEEN NETWORK ENTITIES

BACKGROUND

The present disclosure relates to a system and method for the dynamic control of workload between network entities.

In a network, long-lived network connections between network entities (or nodes) permit network entities to request services from each other without the overhead of having to establish a network connection for every request. Some connection management software, such as the IP interconnectivity function provided by IBM® CICS® Transaction Server (CICS TS) for z/OS® and the Customer Information Control System (CICS) Transaction Gateway (CICS TG), supports the execution of multiple, concurrent requests over a single network connection between a pair of network nodes. Request messages are serialized over the connection, but the responses to individual requests may be returned in a different order, allowing the processing time for each request to vary. A message will contain request data that the client is passing to the server (or vice versa), which will form the payload or body of the message. The message will also contain meta data, which will form one or more headers of the message, where the role of the meta data is to provide instructions to the recipient of the message on how to handle the request data.

Controls are known which prevent one network node from flooding a partnered network node with requests, when the partner is unable to process its current workload. For example, it is known to configure the request sender (referred to in this document as the client) so that it only has a fixed number of request slots. For example, the parameter "Number of Send Sessions" can be used to set a maximum number of concurrent requests that a client can route over a connection. The number is set when the connection is first established and persists for the lifetime of the connection. Another known example is where the service provider (referred to in this document as the server) maintains a queue for requests that have been received, but not yet processed, and, when the queue is full, the server causes any additional requests that it receives to be rejected. These approaches work well for paired systems which have only a single connection between them, as their overall capacity can be calculated in advance and so the capacity of the connection can be set to match. However, large scale systems often have multiple points of entry and so it is not a simple to task to configure their connections in a way which provides for efficient management of these requests.

For example, a CICS TS for a z/OS production server region is likely to have multiple connections to it over which request messages may arrive. The request traffic rate over any single connection is likely to vary considerably over time. Moreover, the request traffic rate between different connections is also likely to vary considerably over time. It is not practical to configure a server to match the maximum capacity of all of its clients, as this would lead to large amounts of redundancy. Instead, each connection is configured to support more than its fair-share of the server's overall capacity so that during times when the server is less busy a busy client can route a higher rate of requests to the server. Consequently, there may be prolonged periods of time during which requests are queued before they can be serviced by the server, or during which requests are rejected by the server.

To address this issue, it is known for clients to use additional software to discover if they are using a particular connection to its full capacity: z/OS Work Load Manager (WLM) and Tivoli Netview (IBM®) are examples. This additional software runs alongside the systems that are using the connection and is configured separately from the connection it monitors.

SUMMARY

Certain shortcomings of the prior art are overcome and additional advantages are provided, in one or more aspects, through the provision of a computer-implemented method performed on a server with a server connection manager in order to control workflow relating to server status information requests received from clients. The method includes establishing, according to a network protocol, respective concurrent network connections between the server and at least one client, and managing each established network connection by sending and receiving messages from server to client and client to server respectively, wherein each message includes a set of message headers and a message body. Further, the method includes running a server status handler component in the server connection manager to detect and handle status information requests in message headers of incoming messages arriving from clients over the concurrent network connections, and for each status information request, gathering at least some of the status information requested by the client. Additionally, the method includes adding the status information which has been gathered to a message header of an outgoing server-to-client message and sending the message containing the status information to the requesting client.

Systems and computer program products relating to one or more aspects are also described in claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

In the following, aspects of the present invention are described by way of example with reference to exemplary embodiments illustrated in the figures, where.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Different aspects of the invention provide complementary server and client systems and methods for dynamically controlling workload between them.

According to one aspect of the disclosure, there is provided a computer automated method performed on a server with a server connection manager in order to control workflow relating to server status information requests received from clients. The method includes: establishing, according to a network protocol, between the server and at least one client respective concurrent network connections; managing each established network connection by sending and receiving messages from server to client and client to server respectively, wherein each message comprises a set of message headers and a message body; running a server status handler component in the server connection manager to detect and handle status information requests in message headers of incoming messages arriving from clients over the concurrent network connections; for each such request gathering at least some of the status information requested by the client; adding the status information which has been gathered to a message header of an outgoing server-to-client message; and sending the message containing the status information to the requesting client.

According to another aspect of the disclosure, a server is provided including: a communications interface operable to establish, according to a network protocol, between the server and at least one client respective concurrent network connections, and to manage each established network connection by sending and receiving messages from server to client and client to server respectively, wherein each message includes a set of message headers and a message body; a server connection manager operable to control workflow relating to status information requests received from clients; and a server status handler component of the server connection manager operable to: detect and handle status information requests in message headers of incoming messages arriving from clients over the concurrent network connections; for each such request, gather at least some of the status information requested by the client; and adding the status information which has been gathered to a message header of an outgoing server-to-client message.

According to a further aspect of the disclosure, a computer automated method is provided performed on a client with a client connection manager to control workflow relating to server status information requests transmitted by the client to a server, the method comprising: establishing, according to a network protocol, between the client and a server a network connection, which operates by sending and receiving messages from client to server and server to client respectively, wherein each message comprises a set of message headers and a message body; and running a server status handler component in the client connection manager to: add status information requests into message headers of messages that the client sends to the server in order to request status information from the server; and monitor the headers of incoming messages received from the client to detect status information that responds to a previous status information request sent by the client.

According to another aspect of the disclosure, a client is provided including: a communications interface operable to establish, according to a network protocol, between the client and a server a network connection, and to manage the established network connection by sending and receiving messages from client to server and server to client respectively, wherein each message comprises a set of message headers and a message body; and a client connection manager operable to control workflow relating to server status information requests transmitted by the client to a server with which it has an established network connection; a server status handler component in the client connection manager which is operable to: add status information requests into message headers of messages that the client sends to the server in order to request status information from the server; and monitor the headers of incoming messages received from the client to detect status information that responds to a previous status information request sent by the client.

Advantageously, in the above aspects, the customized server and client connection managers running respective server status handler components replace the need for a third party agent, such as z/OS WLM or Tivoli Netview, to monitor the state of the server.

With this approach, there should be insignificant impact on the performance of the client or server or the network connection between them, as the customizations of the server and client connection managers are modest and the increase in message header size and/or number to convey the status information requests and responses is proportionally very small in the context of the overall traffic over the connection.

Status information can be rapidly obtained by a client from a server, as requests can be piggybacked onto, or injected into, any message returning to the client from the server. Through its connection manager, a client thus has control over when status information is requested from the server. Consequently, message payload sizes are generally reduced, since status information is only requested by clients when needed.

In the art, messaging that takes place between a pair of network nodes in order to establish a connection between them may be referred to as the Capability Exchange Sequence (CAPEX). In some embodiments, as part of the CAPEX between client and server, the client can specify what types of status information it may wish to request from the server during persistence of the connection, and the server can then, for the lifetime of the connection, restrict itself to collecting only those types of status information for that client.

For the most rapid response by the server, the server-to-client message to which the requested status information is added may be the next such outgoing message to be sent to the requesting client. In other words, the server-to-client message to which the requested status information is added may simply be the next available message into which the requested status information can be injected, rather than a message that has been prepared specifically to respond to the message which conveyed the status information request which is being responded to. This approach ensures the fastest possible return of the status information without significantly affecting the runtime performance of the system.

According to further aspects of the disclosure, there is provided a computer program stored on a computer readable medium and loadable into the internal memory of a server or client to perform one or more of the above-noted aspects of the disclosure. According to other aspects there is provided a computer program product storing the above computer programs.

Figure 1:
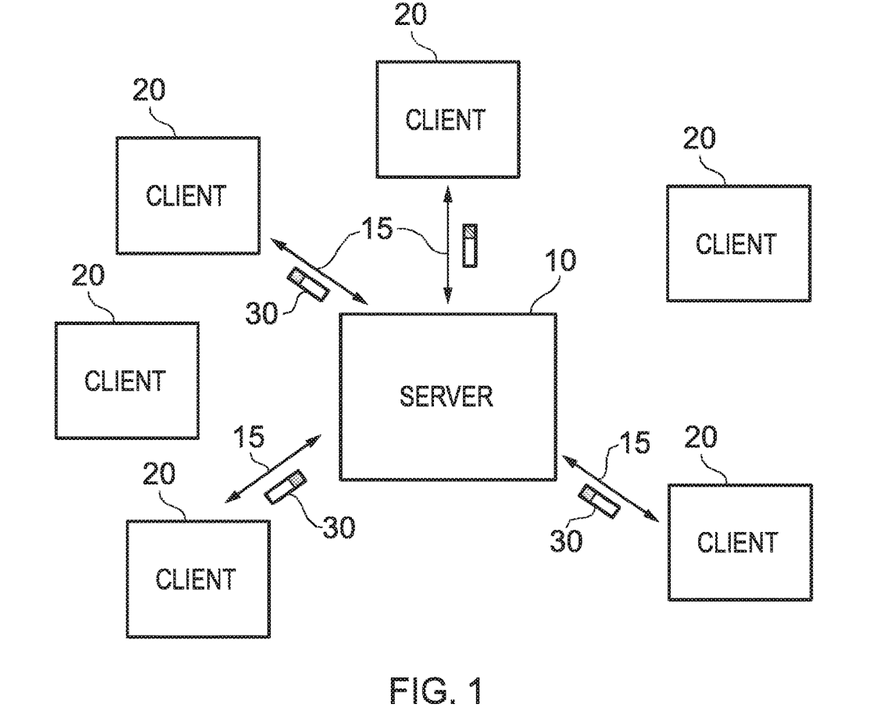
FIG. 1 is a schematic representation of a system environment, in which server and client network nodes are connected via network connections, and which may implement one or more aspects of the present invention.
Figure 2:
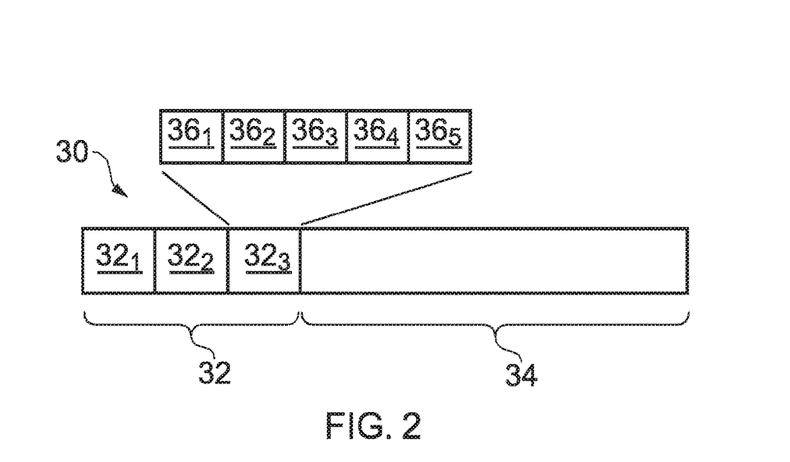
FIG. 2 shows a message structure for messages sent via network connections such as those of FIG. 1, in accordance with one or more aspects of the present invention.

By way of example, FIG. 1 is a schematic representation of a system environment for embodiments of the invention in which server and client network nodes are connected via network connections. A server 10, which may for example be a CICS TS, is in a system region where a number of clients 20 are also arranged. The system uses a network protocol, such as TCP IP, to allow the different nodes to communicate. Each client 20 is able to establish a network connection 15 using the network protocol to at least the server 10. These network connections persist until terminated, and so may be long lived. In FIG. 1, selected clients are shown having current network connections to the server, with multiple concurrent network connections being illustrated. Each established network connection is managed by sending and receiving messages 30, typically in packet form, from server to client and client to server respectively FIG. 2 shows a message structure for messages being sent via the network connections of FIG. 1. Each message may include a header portion 32 and a payload or body portion 34. The header contains control information that is used by the message recipient's connection manager, whereas the body 34 contains details of the service that the client is requesting to run there. The header portion 32 may be split into a set of multiple fields $32_1, 32_2 \ldots 32_n$, each conveying different command and control information relating to the message by which its payload portion 34 can be appropriately processed on receipt. Moreover, each header field $32_n$ may contain one or more status indicators $36_n$ which are specific to the solution proposed herein and contain status information being sent from the server to a client, or specify a status information request being sent from a client to the server. The exact role of these status indicators will be clearer through the following description. It is noted that the header fields may simply be referred to as headers, so that each message can be described as being made up of a set of one or more headers and a body.

Figure 3:
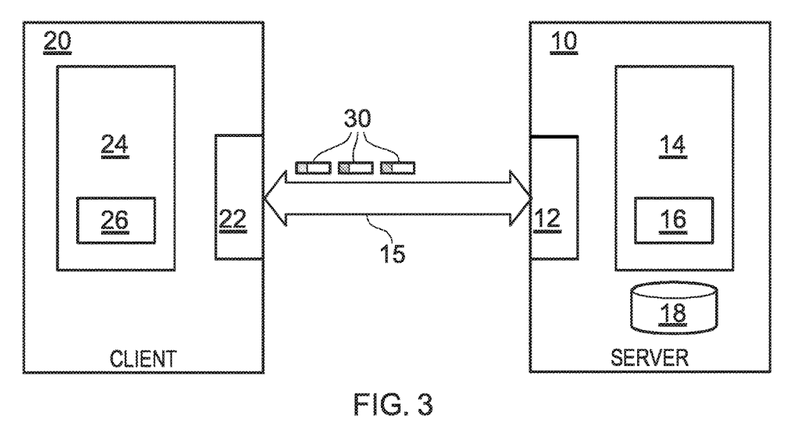
FIG. 3 shows detail of a client-server network connection according to an embodiment of the disclosure, in accordance with one or more aspects of the present invention.

FIG. 3 shows an example of a client-server network connection according to an embodiment of the disclosure. A client 20 has established a network connection 15 to a server 10. The server 10 and client 20 have respective communications interfaces 12 and 22 responsible for establishing and managing the connection.

The server 10 has a connection manager 14 operable to control workflow relating to status information requests received from all clients 20 to which it is connected. The connection manager 14 in the server 10 may be a long lived process that is notified of the arrival of messages over a particular network connection 15 and examines the information in the message headers to decide how to handle the request message. Specifically, as part of the server connection manager 14 according to the present disclosure a server status handler component 16 is provided which is operable to: (i) detect and handle status information requests in message headers of incoming messages arriving from clients over the concurrent network connections; (ii) for each such request, gather the status information requested by the client; and (iii) once gathered, add the requested status information to a message header of an outgoing server-to-client message. The server 10 also has a server status store 18 for storing current values of the server status indicators.

The client 20 also has a connection manager 24 which is complementary to the server's. The client connection manager 24 is operable to control workflow relating to server status information requests transmitted by the client 20 to a server 20 with which it has an established network connection. As part of the client connection manager 24, there is a server status handler component 26 which is operable to: (i) add status information requests into message headers of messages that the client sends to the server in order to request status information from the server; and (ii) monitor the headers of incoming messages received from the client to detect status information that responds to a previous status information request sent by the client.

The client 20 thus runs a server status handler component 26 in its connection manager 24 to add status information requests into message headers of messages that the client sends to the server, while also monitoring the headers of incoming messages received from the client to detect responses. In parallel, the server 10 runs its server status handler component 16 to detect the incoming status information requests from clients in the message headers, and, for each such request, gathers the requested status information and sends it back by adding it to the message header of an outgoing server-to-client message.

The client-server communication in the methods and systems disclosed herein may be viewed an extension to a conventional mechanism used to establish a connection between a pair of network nodes, which is often referred to as the Capability Exchange Sequence (CAPEX). The connection manager component of one network node builds a CAPEX request message for a node it is controlling and sends it through the network using the address of the target node it is attempting to connect to. The target node, if available, receives the message using its own connection manager, acts upon it and sends back a response indicating whether it has accepted or rejected the connection attempt, and the capabilities that it can support over the connection. The response message is then delivered to the requesting node, and its connection manager interprets the contents and uses it to complete or fail the connection establishment attempt. This process is a standard, simple CAPEX sequence. More messages can be exchanged as part of the CAPEX to allow the connection managers at either end of the connection to become aware of the capabilities that their partners have.

This disclosure builds on the standard CAPEX sequence of operations by extending the structure of the CAPEX request messages to include within it certain server status indicators that can be set by the server status handler component 16 of the server connection manager 14 that is responsible for building such messages. That is, as part of establishing a network connection to a client, a limited set of types of status information which may be requested from the server during persistence of the connection may be defined. The sender of a CAPEX request, i.e. the client 20, may set these to indicate that it is requesting specific additional capabilities and, if the server 10 responds positively in the CAPEX reply, then the sender of the CAPEX request becomes the client in a client-server network connection. The client then knows that for the lifetime of the connection it can proceed at any point with the dynamic injection of server status messages into message headers that it builds and sends to the server. Moreover, the server knows from this set up that it can restrict itself to collecting for any specific client only the limited set of status information types agreed during the CAPEX exchange which set up the connection. These types of information can be defined by a set of server status indicators. To make a status information request, the client only needs to list which status indicators it wishes to know, and to respond the server only needs to return current values of those status indicators, by adding them to the message header of an outgoing server-to-client message.

Once a network connection with these capabilities is up and running, the client connection manager 24 can detect if responses are slowing down or speeding up, or can simply find out if it can send a greater number of concurrent requests to the server. The client connection manager 24 then amends the next suitable message that is being sent to the server 10 to ask for whatever status information it wishes to receive. The client connection manager 24 does this by either using a new flag $36_n$ in an existing header portion $32_n$ or by adding a new header portion to the message header. Here it is noted that, typically, a request message from a client to a server consists of a set of message headers, and a single message body, this being the structure of HTTP messages. Other protocols such as systems network architecture (SNA) also conform to this convention.

The server status handler component 16 detects the presence of the status indicators in message headers and acts upon them by gathering the information together and placing it in a subsequent response message that it has built and not yet sent, or is building and has not yet sent. The requested information in the form of status indicators is then sent back to the client. It is noted that the response message will not generally be a formal response to the status information request message, from the perspective of the network protocol. Moreover, if some but not all of the requested status information has been gathered by the server, a partial response can be sent immediately, which can then be followed by one or more further responses once the remaining element or elements of the requested status information have been gathered. In this way, the client neither has to wait for a formal response to a request message, nor until all the requested information has been gathered.

Figure 4:
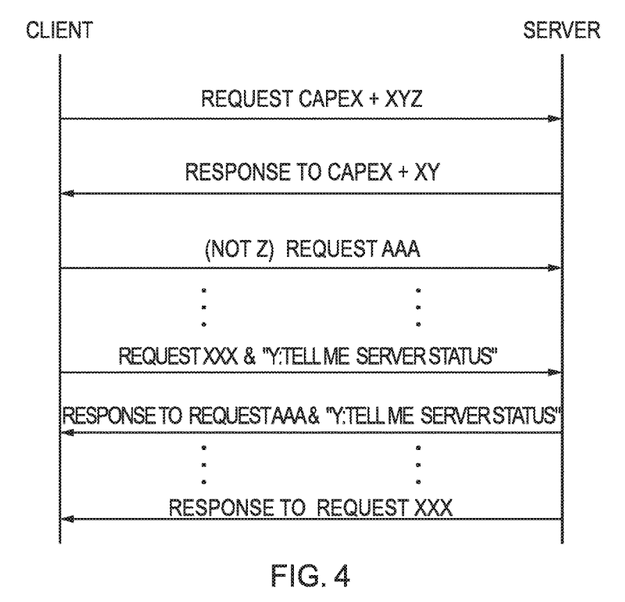
FIG. 4 is a message diagram showing an example message dialogue between the client and server of FIG. 3, in accordance with one or more aspects of the present invention.

FIG. 4 is a message diagram showing an example message dialogue between the client and server of FIG. 3 according to an embodiment of the disclosure. With the first message from client to server, the client acquires a connection using a CAPEX and in the process asks for server status information, i.e. indicators, in respect of X, Y, and Z. These indicators could for example relate to: X—amount of storage available in CICS region of server; Y—server status; and Z—how many long-running tasks are suspended on the server. With the next message, the server responds by stating that it only supports information on X and Y, but not Z. In subsequent messages over the now established connection, a number of request messages AAA to XXX are delivered over the connection. Request XXX has the indicator for status Y set in it, i.e. contains a request by the client for the server to send server status information. This request is in the form of asking for the status of server status indicator Y which the client knows is supported by the server from the time when the connection was initially set up with the CAPEX. The next message from server to client is a response to the much earlier request, request AAA, and the server connection manager has inserted into it the status indicator for Y which is in response to the status information request contained in the more recent message XXX.

In summary of the above-described specific embodiments, the client's connection manager is customized compared to a standard design by adding a process which dynamically customizes messages that flow over an established network connection that it controls, in order to request status information from the server of types that were specified at the time the connection was set up. The client makes a request by injecting the appropriate indicators in the next message header it builds and sends to that server. The client then looks for the status information in the headers of subsequent messages from the server. A complementary custom process is added to the server's connection manager to detect and look for status information requests in request message headers arriving over the client connection, and when found to gather together at least some of the status information the client has asked for, and add it to the next available response message it returns to the client. In one or more embodiments, both server and client will examine all messages for server status information requests and responses, respectively. However, if desired, some filtering could be included. For example, the clients may keep track of which status information requests are outstanding and then be configured only to examine incoming server messages when it is waiting for at least one outstanding piece of status information. Moreover, a server could be configured to cease examining incoming messages for status information requests, when it has no capacity to deal with them, and instead rejection messages could be sent back to the clients in the manner of the prior art as described further above.

In alternative embodiments, the server status handler component 16 might collect all types of status information defined in the CAPEX continually once the connection has been established, so that immediate responses to client status information requests can be sent at all times, rather than the server acting to acquire status information only on request.

It is noted that reference to client and server throughout this document are terms used to reference paired network entities which make status information requests and respond to status information requests respectively and these terms are not intended to imply that other structural or functional features should be ascribed to these network entities.

Figure 5:
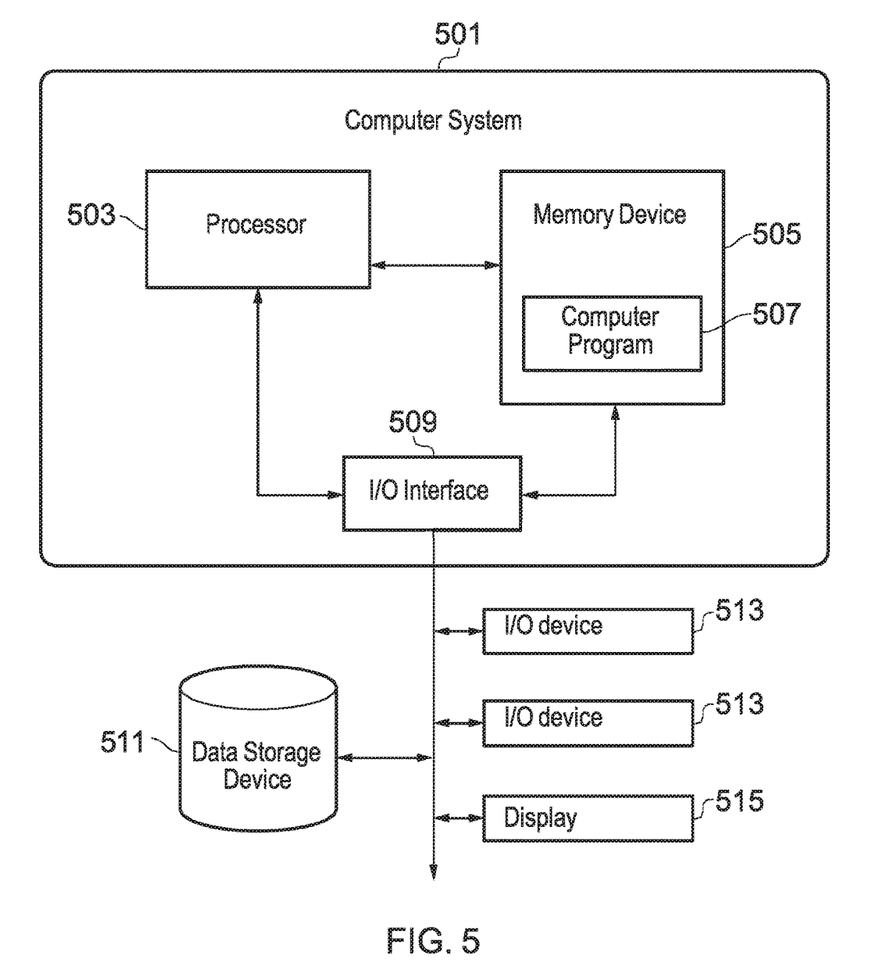
FIG. 5 shows a generic computer device which is an example of how a client or a server of FIG. 3 could be realized, and which may include, or implement, one or more aspects in accordance with the present invention.

FIG. 5 shows a generic computer device which is an example of how a client or a server as shown in FIG. 3 could be realized. Namely, FIG. 5 shows a structure of a computer system 501 and computer program 507 that may be used to implement the client and/or server as described above which embody the present invention. The computer system 501 comprises a processor 503 coupled through one or more I/O Interfaces 509 to one or more hardware data storage devices 511 and one or more I/O devices 513, which can manage graphic object requests, and a display 515 on which the graphics objects can be displayed. The processor 503 may also be connected to one or more memory devices 505. At least one memory device 505 contains stored computer program 507, which is a computer program that comprises computer-executable instructions. The data storage devices 511 may store the computer program 507. The computer program 507 stored in the storage devices 511 is configured to be executed by processor 503 via the memory devices 505. The processor 503 executes the stored computer program 507.

It will be clear to one of ordinary skill in the art that all or part of the logical process steps of the embodiments disclosed may be alternatively embodied in a logic apparatus, or a plurality of logic apparatus, including logic elements arranged to perform the logical process of the method and that such logic elements may include hardware components, firmware components or a combination thereof.

It will be equally clear to one of skill in the art that all or part of the logic components of the embodiments described may be alternatively embodied in logic apparatus including logic elements to perform the method, and that such logic elements may include components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service including deploying a computer program operable to, when deployed into a computer infrastructure and executed thereon, cause the computer system to perform the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It will be clear to one skilled in the art that many improvements and modifications can be made to the foregoing exemplary embodiment without departing from the scope of the present disclosure.

What is claimed is:

1. A computer-implemented method performed on a server with a server connection manager in order to control workflow relating to server status information requests received from clients, the method comprising:

establishing, according to a network protocol, respective concurrent network connections between the server and at least one client;

managing each established network connection by sending and receiving messages from server to client and client to server respectively, wherein each message comprises a set of message headers and a message body;

running a server status handler component in the server connection manager to detect and handle status information requests in message headers of incoming messages arriving from clients over the concurrent network connections, the status information requests being represented by one or more status indicators desired by the clients of status indicator types specified as part of the establishing of the concurrent network connections;

for each status information request, gathering at least some of the status information requested by the client;

adding the status information which has been gathered to a message header of an outgoing server-to-client message as the one or more status indicators; and sending the message containing the status information to the requesting client.

2. The method of claim 1, wherein the server-to-client message to which the requested status information is added is a next outgoing server-to-client message to be sent to the requesting client.

3. The method of claim 1, wherein the server-to-client message to which the requested status information is added is a message that has not been prepared specifically to respond to the message bearing the status information request which is being responded to.

4. The method of claim 1, wherein, as part of establishing a network connection to a client, a limited set of types of status information which the server will support during persistence of the connection are defined, and wherein, for the lifetime of the connection, the server restricts itself to collecting only those types of status information for that client.

5. The method of claim 4, wherein the supported types of status information are defined by respective server status indicators, which pursuant to service client status information requests, are selectively added to the message headers of outgoing server-to-client messages, the status indicators comprising the respective server status indicators.

6. The method of claim 5, wherein the server status indicators are defined by the server status handler component.

7. The method of claim 1, wherein the message containing the requested status information that is sent to the client is not the message which, according to the network protocol governing the network connection, is a response to the message which contained the status information request.

8. The method of claim 1, further comprising running a server status handler component in a client connection manager of a client of the at least one client to:

add status information requests into message headers of messages that the client sends to the server in order to request status information from the server; and monitor the headers of incoming messages received from the client to detect status information that responds to a previous status information request sent by the client.

9. The method of claim 8, wherein the client-to-server message to which the status information request is added is a next client-to-server message to be sent to the server, which message has been prepared for reasons unrelated to making a status information request.

10. The method of claim 8, wherein the status information request is included by adding a new flag to an existing message header of the message.

11. The method of claim 8, wherein the status information request is included by adding a new message header to the message.

12. The method of claim 8, wherein headers of incoming messages are monitored for a response to outstanding requests for status information by seeking server status indicators specific to a limited set of types of status information which the server will support, the status indicators comprising the sever status indicators.

13. The method of claim 8, wherein the monitoring of headers of incoming messages for a response to outstanding requests for status information is not based on recognizing incoming messages which, according to the network protocol governing the network connection, are responses to outgoing messages that requested status information.

14. A system comprising:
a memory; and
a processor communicatively coupled to the memory, wherein the system performs a method in association with a server with a server connection manager in order to control workflow relating to server status information requests received from clients, the method comprising:

establishing, according to a network protocol, respective concurrent network connections between the server and at least one client;

managing each established network connection by sending and receiving messages from server to client and client to server respectively, wherein each message comprises a set of message headers and a message body;

running a server status handler component in the server connection manager to detect and handle status information requests in message headers of incoming messages arriving from clients over the concurrent network connections, the status information requests being represented by one or more status indicators desired by the clients of status indicator types specified as part of the establishing of the concurrent network connections;

for each status information request, gathering at least some of the status information requested by the client;

adding the status information which has been gathered to a message header of an outgoing server-to-client message as the one or more status indicators; and sending the message containing the status information to the requesting client.

15. The system of claim 14, wherein the server-to-client message to which the requested status information is added is a next outgoing server-to-client message to be sent to the requesting client.

16. The system of claim 14, wherein the server-to-client message to which the requested status information is added is a message that has not been prepared specifically to respond to the message bearing the status information request which is being responded to.

17. The system of claim 14, wherein, as part of establishing a network connection to a client, a limited set of types of status information which the server will support during persistence of the connection are defined, and wherein, for the lifetime of the connection, the server restricts itself to collecting only those types of status information for that client.

18. The system of claim 14, wherein the supported types of status information are defined by respective server status indicators, which pursuant to service client status information requests, are selectively added to the message headers of outgoing server-to-client messages, the status indicators comprising the respective server status indicators.

19. The system of claim 14, further comprising running a server status handler component in a client connection manager of a client of the at least one client to:
- add status information requests into message headers of messages that the client sends to the server in order to request status information from the server; and
- monitor the headers of incoming messages received from the client to detect status information that responds to a previous status information request sent by the client.

20. A computer program product for a server with a server connection manager to control workflow relating to server status information requests received from clients, the computer program product comprising:
- a non-transitory computer readable storage medium having program instructions embodied therewith, the program instructions being executable by a processor to perform a method comprising:
    - establishing, according to a network protocol, respective concurrent network connections between the server and at least one client;
    - managing each established network connection by sending and receiving messages from server to client and client to server respectively, wherein each message comprises a set of message headers and a message body;
    - running a server status handler component in the server connection manager to detect and handle status information requests in message headers of incoming messages arriving from clients over the concurrent network connections, the status information requests being represented by one or more status indicators desired by the clients of status indicator types specified as part of the establishing of the concurrent network connections;
    - for each status information request, gathering at least some of the status information requested by the client;
    - adding the status information which has been gathered to a message header of an outgoing server-to-client message as the one or more status indicators; and
    - sending the message containing the status information to the requesting client.

* * * * *